United States Patent
Schnell et al.

(10) Patent No.: US 9,640,978 B2
(45) Date of Patent: May 2, 2017

(54) PROTECTION CIRCUIT FOR AN INVERTER AS WELL AS INVERTER SYSTEM

(71) Applicant: ZIEHL-ABEGG SE, Kuenzelsau (DE)

(72) Inventors: Marco Schnell, Pfedelbach-Renzen (DE); Samuel Werner, Schwaebisch Hall (DE); Dirk Nowosad, Kuenzelsau (DE)

(73) Assignee: ZIEHL-ABEGG SE, Kuenzelsau (DE)

( * ) Notice: Subject to any disclaimer, the term of this patent is extended or adjusted under 35 U.S.C. 154(b) by 0 days.

(21) Appl. No.: 14/973,313

(22) Filed: Dec. 17, 2015

(65) Prior Publication Data

US 2016/0181789 A1    Jun. 23, 2016

(30) Foreign Application Priority Data

Dec. 19, 2014 (DE) .................. 10 2014 226 690

(51) Int. Cl.
*H02H 7/08* (2006.01)
*H02H 5/04* (2006.01)
(Continued)

(52) U.S. Cl.
CPC .......... *H02H 5/042* (2013.01); *H02H 7/1225* (2013.01); *H02H 7/1255* (2013.01); *H02M 2001/325* (2013.01)

(58) Field of Classification Search
CPC  H01L 27/0248; H02H 1/0015; H02H 1/0023; H02H 3/22; H02H 9/008;
(Continued)

(56) References Cited

U.S. PATENT DOCUMENTS 3,678,368 A    7/1972 Popp
6,094,021 A    7/2000 Noro et al.
(Continued)

FOREIGN PATENT DOCUMENTS

DE        19953606 A1    6/2000
DE    102006014297 A1    10/2007
FI          117633 B    12/2006

OTHER PUBLICATIONS

European Patent Office, Extended European Search Report for Application No. 15195451.8, May 11, 2016, 7 pages, Germany.

*Primary Examiner* — Antony M Paul
(74) *Attorney, Agent, or Firm* — Alston & Bird LLP (57) ABSTRACT

A protective circuit for an inverter is disclosed, the protective circuit comprising a safety element, a switching arrangement, and a control circuit, with the safety element being arranged in a feed line to the power element, and the switching device being switched to the safety element such that the switching arrangement bridges the safety element when the switching arrangement is in a conducting state. The control circuit is embodied such that it, upon receipt of one control pulse or several successive control pulses, emits a switching signal to a switching arrangement for a predetermined period of time, with the switching arrangement being switched through in case of periodic receipt of the control pulses and with the absence of the control pulse opening the switching arrangement after a predetermined period of time, and triggering a protection of the inverter by the safety element.

21 Claims, 2 Drawing Sheets

(51) Int. Cl.
*H02H 7/122* (2006.01)
*H02H 7/125* (2006.01)
*H02M 1/32* (2007.01)

(58) Field of Classification Search
CPC ...... H02H 7/093; H02H 7/0833; H02P 27/04;
H02P 6/00; H02M 1/32; H02M 1/34;
H02M 1/38
USPC .... 361/1, 18, 20, 21, 23, 24, 41, 42, 47, 49,
361/56, 57, 90, 91.1, 106, 111, 153, 162,
361/165, 211; 363/40, 44, 47, 95, 120,
363/174, 175; 318/400.21, 400.22,
318/400.01, 700, 400.26, 801
See application file for complete search history.

(56) References Cited

U.S. PATENT DOCUMENTS

| | | | |
|---|---|---|---|
| 6,955,743 B2 | 10/2005 | Rousu et al. | |
| 7,272,302 B2* | 9/2007 | Woodward | B60H 1/00428 |
| | | | 318/801 |
| 8,334,618 B2* | 12/2012 | Bhavaraju | H02J 3/38 |
| | | | 307/86 |
| 2011/0019316 A1 | 1/2011 | Zhan et al. | |
| 2011/0164340 A1* | 7/2011 | Takeda | H01H 37/5427 |
| | | | 361/25 |
| 2014/0063876 A1* | 3/2014 | Buckey | H02M 1/32 |
| | | | 363/50 |

* cited by examiner

PROTECTION CIRCUIT FOR AN INVERTER AS WELL AS INVERTER SYSTEM

CROSS-REFERENCE TO RELATED APPLICATIONS

This application claims priority to and the benefit of German Application No. 10 2014 226 690.4, filed Dec. 19, 2014, the contents of which as are hereby incorporated by reference in their entirety.

BACKGROUND

Technical Field

The invention relates to a protection circuit for an inverter, in particular, for an inverter for an electric motor, with the inverter comprising a control system and a power component controlled by said control system, and with the control system being designed for the periodic output of a control pulse. Furthermore, the invention relates to a respective inverter system.

Related Art

Inverter systems are widely used in the field. An inverter system generates an alternating voltage from an input voltage, with its frequency and amplitude being selectable to a large extent. An important application of inverter systems is the control of electric motors, for example, permanently excited synchronous motors. Very frequently, the input voltage is provided by a power supply system, with the inverter system being connected to one or all three phases of said power supply system. In inverter systems with a direct current-link a rectifier generates a direct voltage from the input voltage; and this direct voltage is converted by a power component of the inverter system into the desired alternating voltage. For this purpose the power component comprises semiconductor switches, which are controlled by a control system, usually via pulse-width modulated signals (PMW signals). Frequently IGBTs (insulated gate bipolar transistors) or field effect transistors are used as semiconductor switches.

It may occur in inverter systems that individual semiconductor switches quit working correctly. In this case the faults, in which the semiconductor switch remains in a low impedance state, are relatively non-critical. In this case either the load current limiter engages or the semiconductor switch is destroyed as a result of the internal temperature rise. Also of relatively non-critical importance are conditions, in which the semiconductor switch remains in a sufficiently high-impedance state, because no problematic currents flowing into the load are expected. However, particularly critical are fault conditions, in which the semiconductor switch has such an impedance that the power loss at the semiconductor is too low to destroy the semiconductor due to an internal temperature rise and simultaneously preventing the d.c. link from short-circuiting. In this situation uncontrolled currents are conducted into the load, without here the usual protective measures taking effect, such as current limiting.

One way in which this state can develop is known as PTOM (partial turn on mode). In this situation an arbitrary control voltage can be applied to the semiconductor switch, without changing the state of the defective semiconductor switch. Thus, the control voltage can no longer control the semiconductor switch. A similar fault condition is the so-called loss-of-gate, in which the control voltage is no longer applied to the semiconductor switch, because, for example, a bonding wire is broken or a control system, which is supposed to emit the respective control voltage to the semiconductor switch, fails to function correctly. In this condition as well, the semiconductor switch remains in an undefined state.

In both fault situations an uncontrolled current is applied to the load; and said current can impermissibly heat this load or can trigger a malfunction or can even induce destruction of the load. When, for example, the inverter system generates a three-phase alternating current network for a synchronous motor and one leg of the inverter bridge no longer operates correctly, the rotating field generated in the stator is applied in an extremely unsymmetrical fashion. This leads to a considerable mechanic stress on the motor and can destroy the winding of the permanently energized coil of the stator. In both cases a safe state for the application and the user can no longer be ensured. A protection circuit is, therefore, necessary which also allows the inverter system to be safely shut off in the event of these fault conditions.

According to the fault analysis method of the VDE (Association of Electrical, Electronics, and Information Technology), it is also necessary to compensate for any other faults regarding the aforementioned PTOM and/or loss-of-gate. This primarily relates to a malfunction of the semiconductor control system, which under certain circumstances can no longer be shut off in a controlled fashion. In this case a protection circuit must also allow this combination of critical faults to be compensated for.

BRIEF SUMMARY

Therefore, the object of the present invention is to design and improve a protection circuit and an inverter system of the type mentioned in the introduction in such a way that in the case of a malfunction in the power component and/or in the control system, the inverter can be switched into a safe state.

The invention achieves the aforementioned object by means of the features disclosed in claim 1, according to which, the protection circuit in question is characterized by a safety element, a switching arrangement, and a control circuit, with the safety element being arranged in a feed line to the power component, with the switching arrangement being connected to the safety element such that the switching arrangement bridges the safety element when the switching arrangement is in a conducting state, with the control circuit comprising a control input, at which the control pulse is applied, and with the control circuit being designed such that the control circuit, upon receipt of a control pulse or several successive control pulses, outputs for a predetermined period of time a switching signal to the switching arrangement, causing the switching arrangement to switch through when periodically receiving the control pulse, and when the control pulse is absent, the switching arrangement opens after a predetermined period, and a protection of the inverter is triggered by the safety element.

With regards to an inverter system, the aforementioned objective is achieved by means of the features disclosed in claim 14, according to which the inverter system comprises a control system, a power component, and an inventive protection circuit, with the control system being designed to output control signals to the power component in order to generate and output an alternating voltage, with the control system additionally being designed for a periodic output of a control pulse input to the protection circuit.

First of all, it was recognized in an inventive way that a protection circuit can react particularly well to fault scenarios within the inverter when the control pulses of the control system are appropriately used. Here, in this context all signals are considered to be control pulses, which show that a control system is ready to run. These control pulses could, therefore, also be called heart-beat signals or watchdog signals. Therefore, the control system periodically outputs control pulses, with preferably one control pulse output by a microcomputer operating in the control system, for example, a microcontroller. Respective programs and methods for the generation and periodical output of a control pulse are well known from the field.

In order to use these control pulses, the protection circuit, according to the invention, comprises a safety element, a switching arrangement, and a control circuit. The safety element is arranged in a feed line to the power component of the inverter. The switching arrangement is connected to the safety element such that the switching arrangement bridges the safety element when the switching arrangement is in a conducting state. Thus, by shifting the switching arrangement into a conducting state, the safety element is protected from a potential overload.

The control circuit is used in the inventive protection circuit for generating a switching signal for the switching arrangement from the control pulse of the control system. For this purpose the control circuit has a control input, into which the control pulse is inputted. The control circuit generates, based on the received control pulse or a plurality of received control pulses, a switching signal for the switching arrangement. This switching signal is kept at a value for a predetermined period; and this value sets the switching arrangement into a conducting state, with or without interposing additional components.

This inventive combination of control pulses and control circuit makes it possible to achieve that when the control pulses are received periodically, there is a constant output of a switching signal to the switching arrangement, causing the switching arrangement to remain in a conducting state. When the control pulse is absent, there is the option of "refreshing" the generation of the switching signal, until the expiration of the predetermined period, by outputting a new control pulse at the control circuit. If the predetermined period expires without the receipt of another control pulse, a switching signal is no longer generated and the switching arrangement is opened; i.e., the conducting state is left and, thus, a high-impedance condition is assumed between the two terminals of the switching arrangement. In this way the current no longer flows in the feed line to the power component via the switching arrangement, but rather via the safety element. Thus, the safety element can be triggered. In this case it would be conceivable, for example, to limit the flowing current to a predetermined value or to generate a high-impedance separation of the feed line from the power component. In this way it is possible to achieve a safe operation of the protection circuit in a normal state and simultaneously protect the inverter and/or the connected load against the absence of the control pulse. In this way it is possible to provide, without any excessive additional circuitry, a protection circuit, with which a power component can be set into a secure operating state, even if a PTOM or a loss-of-gate occurs at the power component. In this way the inverter and the load, connected to the inverter, are protected from further damage.

The term "feed line," in which the safety element is arranged, may relate to various areas between the power supply and the power component. When the inverter has, for example, a direct current voltage link, the safety element could be disposed in the line for the positive intermediate circuit direct current voltage. It would also be conceivable to arrange the safety element, if the inverter were connected to the power supply system, in the alternating voltage area. In a one-phase coupling, the safety element could be disposed in a connecting conductor to the phase used. In a three-phase coupling, an appropriate safety element could be provided for each of the phases. Then several switching arrangements or at least several independent poles of the switching arrangement should be provided.

In this context the term "conducting state" is understood to mean that the impedance between the two terminals of a switching contact of the switching arrangement has a low impedance value, preferably below 1Ω, in particular, preferably below 0.1Ω.

The "predetermined period", after which the output of the switching signals is terminated, is preferably defined by the design of the control circuit. In this case the period is selected in relation to a control pulse such that the predetermined period is greater than the period length between two successive control pulses. Preferably the predetermined period is five times longer, in particular, preferably ten times longer than the period length between two successive control pulses.

The safety element may be formed in various ways. In this case the term "safety element" relates in general to a component or an assembly that is capable of limiting a potential current flux in the feed line to a maximum value. This may occur by interrupting the circuit upon a maximum current load being exceeded (such as a fuse, for example) or by a current-limiting effect (such as a resistance, for example). A person skilled in the art is aware of the different components that meet these requirements, with some preferred exemplary embodiments being referenced in the following. For the sizing of the safety element it is essential that the safety element reliably trigger upon reaching the critical stage. This will normally depend on the standard operating conditions of the inverter and the load connected thereto. For example, when the load, operated by the inverter, comprises an electric motor, the inverter is usually specifically adjusted to the driven electric motor and in many cases even integrated in the housing of said electric motor. Thus, it is easy to provide a safety element that meets the requested boundary conditions. The boundary conditions for the operation are also sufficiently known in other applications, in order to define the conditions for a critical stage.

The control system is usually supplied with energy from the same source as the power component and the protection circuit. Thus, in certain arrangements of the safety element, the control system is first supplied with energy via the safety element. When connecting the inverter system to the power supply, the control system is started. This includes in most cases the loading of the control program in a microcomputer, for example a microcontroller. In this phase of the startup, the current in the feed line to the power component is still relatively low, because the control system does not yet actuate the semiconductor switch of the inverter bridge; and, thus, no current has been applied yet to the load. Therefore, in this embodiment the safety element itself should be capable of transferring the power for the control system and the protection circuit. Due to the fact that furthermore, after switching on the inverter system, the internal capacitances (for example, a d.c. link capacitor) or inductances (for example, a filter throttle) are charged, the safety element should additionally be able to accept these currents.

A potential embodiment of the safety element could be given in a PTC (positive temperature coefficient) resistance. The use of PTCs in feed lines of devices is particularly known for limiting the switch-on current. This feature exploits the fact that a PTC heats up due to the current flux and shows increasingly higher impedance. As a result, the current flux can be limited. The use of a PTC as a safety element in a protection circuit according to the invention makes it possible to provide an additional benefit that goes beyond providing protection when switching on a device. When the PTC is used as a safety element for the protection circuit according to the invention, said PTC should be sized such that it can conduct the switch-on currents without problems. In order to act as a safety element, it should also be sized such that, for example, in the event of a PTOM, a critical current can no longer flow into the load so that thermal damage or any other damage to the load, resulting therefrom, is prevented.

According to another embodiment, the safety element could be formed by a fuse. That is, in this embodiment the safety element interrupts the feed line to the power component and, thus, the circuit when a predetermined maximum current flux is exceeded. Here, too, the statements made above regarding sizing are applicable accordingly. In order to avoid tripping the fuse during the switch-on process, additionally a switch-on current limiter may be provided, for example, in the form of an NTC.

In another embodiment the safety element is formed by a resistor. In this case the resistor may be sized as high impedance and with sufficient abilities for power consumption so that when opening the switching arrangement the resistor can limit the current flowing in the feed line. This embodiment has the advantage that the input voltage in the protection circuit is commonly known and/or assumes a defined maximum value. As a result, this embodiment of the safety element is comparatively independent of the load, operated by the inverter. For inverters sized for relatively small loads, this feature makes it very easy to realize a safety element.

In certain embodiments the safety element is, however, formed by a safety resistor. A safety resistor—also known as a "fuse resistor"—is a resistor that has a first resistance value in an initial state. Here, resistance values of a few ohms up to triple digit values are common. Depending on the embodiment of the fuse resistor, resistances in the double-digit kΩ range can also be achieved. At the same time every fuse resistor has a maximum permissible load limit, up to which this first resistance value is maintained. When this limit load is exceeded, the fuse resistor assumes a second resistance value, which is considerably greater than the first resistance value. In this case resistance values in the MΩ range are common. This process is not reversible in most fuse resistors. Therefore, once the limit load has been exceeded, the fuse resistor must be exchanged. Due to the fact that the fault situation to be treated here requires in most cases an extensive repair of the inverter system, this circumstance is rather marginal compared to the benefit achieved thereby. Fuse resistors show the particular advantage that they trigger quickly and, after triggering, form a very high-impedance transition.

In one potential embodiment of a fuse resistor, the resistor is provided with a spring that is held in a tensioned state with a small amount of tin. This embodiment is common in wire wound wire resistors. A high load on the fuse resistor with a high current causes the fuse resistor to heat up, as a result of which the tin also heats up. When a temperature threshold is exceeded, the tin becomes so soft that it can no longer hold back the spring; and, therefore, said spring jumps into the relaxed state. At the same time the previously conducting contact is interrupted, and a high-impedance is assumed between the two terminals of the fuse resistor. It is also conceivable that there is an area in the resistor that melts at a high current load—similar to a common fuse. Appropriate embodiments are well known from the field.

In principle, a control pulse may assume various embodiments, as long as it is periodically outputted by the control system and can be suitably evaluated by a control circuit. For example, a sinusoidal half-wave, a triangle, or a ramp would be conceivable. However, in certain embodiments the control pulse has a square shape. That is, the control pulse assumes a high level for a certain period of time and then drops back to the low level. In this case the transitions between low and high levels and/or high and low levels are very steep, ideally approximately vertical. This leads to the formation of a periodic output of the control pulses as square waves. This embodiment is particularly advantageous in that the microcontrollers that are used most frequently in control systems can generate square-wave signals in a particularly easy fashion. In certain embodiments the square-wave signal is unipolar; i.e., it alternates from a voltage of 0 V (low level) to a maximum voltage (high level), for example 3.3 V or 5 V.

In certain embodiments the sequence of control pulses is fed via a high-pass filter into the control circuit. In this way any component of the direct voltage that may be found in the control circuit is kept away from the control system. In addition, it is possible to provide a current limiter, with which the current from the control system into the control circuit is limited. In the simplest case this current limiter can be formed by a resistor.

In still other exemplary embodiments the evaluation circuit comprises a charge pump. Charge pumps generate, from alternating signals at their input, a voltage, which is greater than the input voltage. Depending on the embodiment of the charge pump, different voltage increases can be realized. Simply designed charge pumps achieve double the voltage. For the use of a charge pump in the evaluation circuit it is essential that the sequence of control pulses forms an alternating signal. However, this is easily fulfilled by the demand for a periodic control pulse. Here, too, the use of a square-wave signal is particularly advantageous, because almost constant output voltages from the charge pump can be achieved in a relatively simple fashion.

In certain embodiments the charge pump is designed like a Greinacher circuit. For this purpose the charge pump has two diodes and one storage capacitor. The two diodes are connected in series, and each points away with its conducting direction from the ground. At the point of connection between the two diodes, the control pulses are inputted such that the point of connection forms the input to the charge pump. One of the two diodes is connected with its anode to ground. The cathode of the other diode is connected to a terminal of the storage capacitor, while the second terminal is connected to ground. Thus, the storage capacitor is connected parallel to the two diodes. Thus, at a high-level of a control pulse, current can flow via the diode, facing away from the ground, into the storage capacitor. As a result, the storage capacitor is charged successively.

In yet another development a discharge resistor is connected parallel to the storage capacitor, by which the storage capacitor is discharged in a defined fashion. Thus, by suitably sizing the discharge resistor, the time elapsed since the most recently received control pulse up to the deactivation of the circuit signal can be defined. In certain embodiments the discharge resistor is designed as high-impedance; i.e., the resistance is at least 100 kΩ, in particular at least 1 MΩ.

In certain embodiments the diodes of the charge pump are formed by Schottky diodes. Due to the fact that it has a lower forward threshold voltage than conventional diodes, the sequence of control pulses can be used more effectively.

The voltage at the storage capacitor can be used as a control signal. In this case a filter circuit, for example, in the form of a low pass circuit, may be provided in order to filter out any alternating components that may still be present. Additionally, the filter circuit may assume a protective function, for example by limiting the flowing current.

In certain embodiments of the switching arrangement it is formed by a transistor, with the switching signal being applied to its control input. In the case of a bipolar transistor, this control input is formed by the base, for example. In yet another development this transistor is formed by a MOSFET (metal oxide semiconductor field effect transistor) so that the control input is formed by the gate of the transistor. Preferably, in this case an enhancement type MOSFET is used, in particular, preferably an n-channel MOSFET. The transistor could be arranged parallel to the safety element and could switch through when a switching signal is applied and, thus, could conduct the current in the feed line to the power component.

In another embodiment of the switching arrangement it is formed by a relay, which has at least one switching contact and one exciter coil. At least one of the switching contacts is connected parallel to the safety element. A relay with several contacts, for example, three contacts, may be used to protect all three phases of a three phase power supply. A transistor may be provided to drive the current for the exciter coil; and this transistor in turn is designed as a MOSFET. Here, again an n-channel MOSFET, which is configured as an enhancement type, is used in a particularly preferred way.

For protection from multiple faults, the control circuit and/or the switching arrangement may be designed with redundancy. In this case two essentially identical control circuits may be provided, each generating one switching signal. When using transistors as the switching arrangements or as driver stages for the actual switching arrangement, they could be provided for every redundant leg of the control circuit, and, in so doing, be connected in series to each other. In this way, for example, a fault can be detected that one of the transistors for one of the redundant paths is defective and, thus, is permanently in a conducting state. When the control pulse is no longer applied to another leg of the redundant control circuit, the protection circuit can still be triggered.

Depending on the embodiment of the switching arrangement, individual parts may also be designed with redundancy, while other parts are present as one unit only. When the switching arrangement is formed by a relay, for example, it may be present only in one unit—when said relay is UL (Underwriters Laboratories) or VDE certified, for example. In the case of a dually designed control circuit, which respectively controls one transistor, the two transistors would be connected in series and would, for example, be connected on one side to ground, while the other side is connected to the exciter coil, with the second terminal of the exciter coil in turn being connected to a supply voltage.

In the inverter system according to the invention, in addition to the failure of the control system resulting in the absence of the control pulses, a malfunction inside the power component may also occur. Many inverter systems have a feedback from the load circuit, by means of which it is possible to draw conclusions about the operating state of the load and/or the power component. For example, an inverter for controlling an EC (electronically commutated) motor requires information about the position of the rotor in order to be able to output the correct voltages for the stator. This information can be obtained by a dedicated sensor or by way of estimation. In the event of a malfunction in the power component, the rotary motion of the motor will be clearly less homogeneous so that it is possible to draw conclusions about the operating state of the motor from the position signal. Other methods are also possible, for example, measuring the aggregate current. A person skilled in the art is aware of suitable methods that allow the user to draw conclusions about the operating state of the load and/or the power component. From the determined or estimated operating state, it can then be decided if a critical operating state exists, which requires triggering the protection circuit according to the invention.

In order to evaluate information regarding the operating state, a preferred further development of the inverter system according to the invention provides means for detecting said operating state. These means may deactivate the generation of a control pulse upon detection of a critical operating state. In this way even in the event of a PTOM, the microcontroller can initiate a switching of the load into a safe operating state. When using a fuse resistor, this would mean that the electric motor is separated from the power supply system and perhaps specifically braked via a brake chopper.

Herein and throughout, where an exemplary embodiment is described or an advantage thereof is identified, such are considered and intended as exemplary and non-limiting in nature, so as to not otherwise limit or constrain the scope and nature of the inventive concepts disclosed.

BRIEF DESCRIPTION OF THE SEVERAL VIEWS OF THE DRAWING(S)

At this point, there are various options for developing and implementing the teaching of the present invention in an advantageous manner. For this purpose, reference is hereby made on the one hand to the claims dependent on claim 1 and/or 15, and on the other hand to the following explanation of a preferred exemplary embodiment of the invention and the drawings. In the context of the explanation of the preferred exemplary embodiment of the invention and the drawings, other generally preferred embodiments and further developments of the teaching are explained as well. The drawings show:

DETAILED DESCRIPTION OF VARIOUS EMBODIMENTS

Various example embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
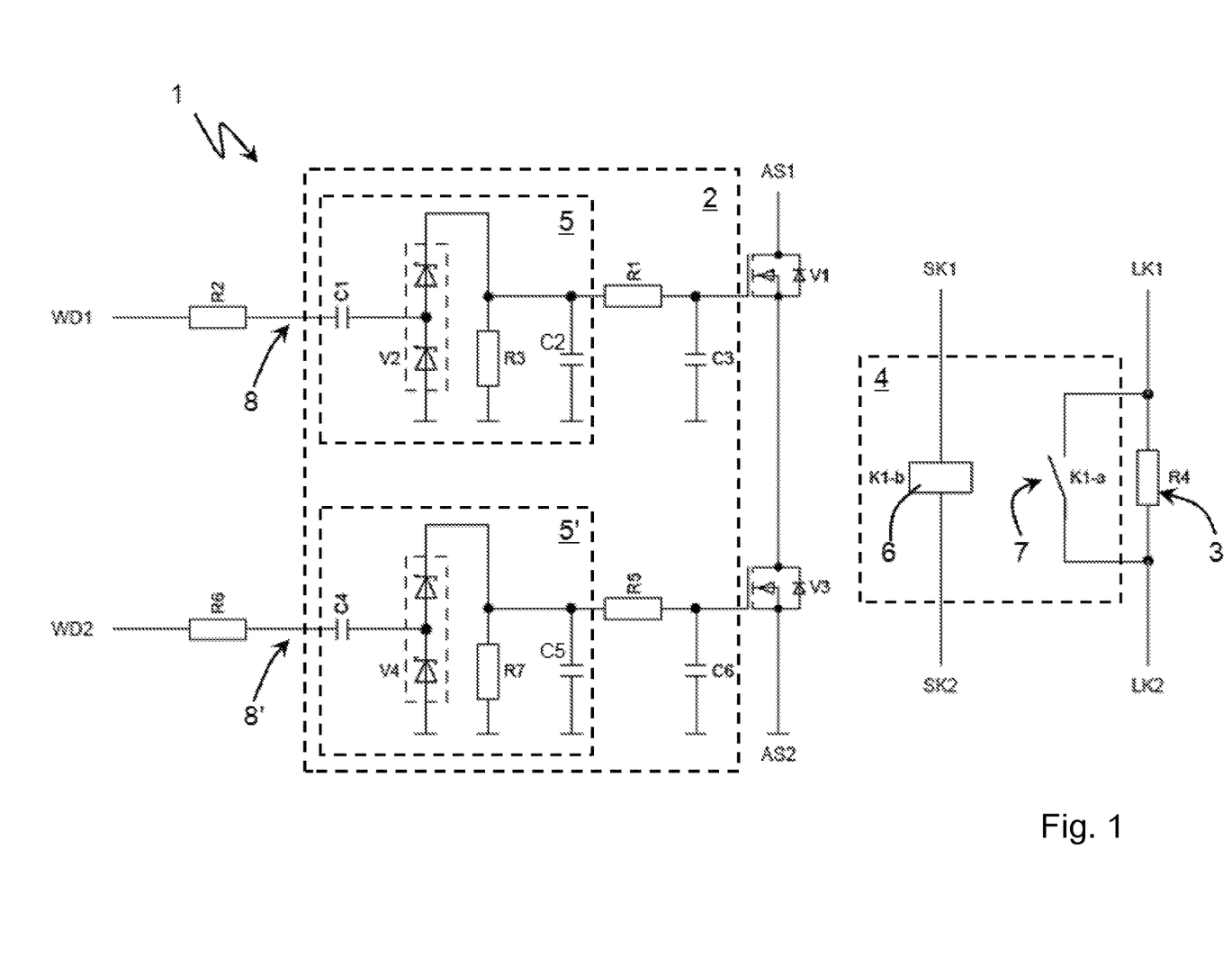
FIG. 1 is a schematic diagram of an exemplary embodiment of a protection circuit according to the invention with a redundantly embodied control circuit.

FIG. 1 shows a schematic of an exemplary embodiment of an inventive protection circuit 1 for an inverter (not shown). The protection circuit 1 comprises a redundantly designed control circuit 2 with two identically designed legs. Furthermore, the protection circuit 1 comprises a safety element 3 as well as a switching arrangement 4 in the form of a relay K1.

A control system, not shown, generates periodic control pulses WD1 for input into one of the two redundant legs of the control circuit 2 (the upper leg in FIG. 1). Correspondingly there is an input of periodic control pulses WD2 into the lower leg of the control circuit. Due to the identical design of the two legs, the following explanations relate to both legs of the control circuit, with the reference numerals and characters without brackets respectively indicating the upper leg and the reference numerals and characters in brackets respectively the lower leg.

The control pulses WD1 (WD2) pass through a serial circuit comprising a resistor R2 (R6) and a capacitor C1 (C4) and are then fed to the control circuit 2 at the control input 8 (8'). The resistor R2 (R6) serves to limit the current output of the control system. The capacitor C1 (C4) acts as the high pass, providing a separation between the control system and the control circuit 2 with regards to direct voltage.

The control circuit 2 comprises a charge pump 5 (5') as well as a resistor R1 (R5) and a capacitor C3 (C6). The charge pump 5 (5') comprises two Schottky diodes V2 (V4), which are connected in series to each other and with their conducting directions respectively pointing away from a ground. Correspondingly the anode of the lower diode $V2_u$ ($V4_u$) is connected to ground. The point of connection between the lower diode $V2_u$ ($V4_u$) and the upper diode $V2_o$ ($V4_o$) forms the input of the charge pump 5 (5'). The cathode of the upper diode $V2_o$ ($V4_o$) is respectively connected to a terminal of a discharge resistor R3 (R7) and of a storage capacitor C2 (C5), with the point of connection between the three components forming the output of the charge pump 5 (5'). The second terminal of the discharge resistor R3 (R7) and of the storage capacitor C2 (C5) are each connected to ground, respectively.

The resistor R1 (R5) is connected with one terminal to an output of the charge pump 5 (5'); with the second terminal, to the capacitor C3 (C6). The second terminal of the capacitor C3 (C6) is connected to ground. The point of connection between the resistor R1 (R5) and the capacitor C3 (C6) is connected to a gate of an enhancement type n-channel MOSFET V1 (V3), which acts as a driver transistor for the switching arrangement. The resistor R1 (R5) and the capacitor C3 (C6) form a filter circuit, particularly a low pass, which reduces alternating components in the output voltage from the charge pump 5 (5').

It should be pointed out that the resistors R2 (R6) and R1 (R5) as well as the capacitor C3 (C6) are optional and are not necessarily required for the protection circuit to function. Due to the fact that they, however, protect the components of the inverter system, they are included in the exemplary embodiment that is shown.

The two MOSFETs V1 and V3 are connected in series to each other; i.e., the source of MOSFET V1 is connected to the drain of MOSFET V2. The source of MOSFET V2 is connected to ground, while the drain of MOSFET V1 is connected to the exciter coil 6 of the relay. In concrete terms this means that the terminals AS1 and SK2 are connected to each other. The second terminal SK1 of the exciter coil 6 is supplied with a supply voltage. The switching contact 7 of the relay is connected with both of its terminals to both sides of the safety element 3. Without any current flowing through the exciter coil the switching contact 7 is opened; with current flowing through the exciter coil 6 the switching contact 7 closes and, thus, assumes a conducting state. The switching arrangement 4 and the safety element 3 are arranged directly downstream of a bridge inverter (not shown) via LK1 and LK2 in the load circuit; i.e., the safety element 3 is arranged in a direct current voltage link. In this case the safety element is designed as a fuse resistor R4.

When the protection circuit is running, the storage capacitors C2 and C5 serve as charge storage, which in the normal case are charged with every positive WDx-signal level so that upon reaching the required gate source voltage the respective MOSFET V1 and/or V3 show low impedance. The control pulses WD1 and WD2 must be above a predetermined frequency, which depends on the high-passes at the input (C1 and/or C4) and the charge storage units (C2 and C5) and their discharge resistors (R3 and R7). When the WDx-signal is drawn to a stationary high level or if a fault occurs in the controller, to which a high level is permanently applied at the respective outputs, the capacitors C1 and/or C4 become high-impedance so that the current flux to the storage capacitors C2 and/or C5 is interrupted.

The upper diodes $V2_o$ and $V4_o$, respectively, prevent the discharging of the storage capacitors C2 and C5 when the WDx signal is low. The lower diodes $V2_u$ and $V4_u$ ensure the discharge of the capacitors C1 and C4 when the WDx signal is low so that in the subsequent cycle current flux into the storage capacities C2 and/or C5 is once more possible. The high-impedance resistors R3 and R7 discharge the storage C2 and C5 so that in the event of a fault the control signals of the FETs are drawn to low after a certain period of time, and they allow the relays to drop.

When switching on, the d.c. link is charged via the safety element 3 so that the switching-on current is limited thereby. The electronics can assume their function. As soon as this is the case, the control system and/or the microcontroller operating there generate and/or generates periodically control pulses at the WDx output in such a way that no load current flows yet. As soon as the controller outputs the control pulses in the correct frequency band and the storage capacitors are charged, the FETs switch to ground and the relay is activated. In this way, the fuse resistor R4 is bridged, and the load circuit shows low impedance. In the event of an error in PTOM with/without secondary faults, the control pulses WDx are no longer applied at the input of the protection circuit, and the relay drops off. The fuse resistor R4, after brief load current flux, opens the d.c. link so that a safe state of the electronics is assumed.

The exemplary embodiment, described in conjunction with FIG. 1, can realize some or all of the following advantages and features:
high voltage stability in order to prevent loss of function, in the event of overvoltage (for example, by bridging of other potentials)

high voltage stability in order to avoid additional components (for example, Zener-diodes)

increased efficiency two control voltages (WD1 and WD2), independent from each other, in order to prevent loss of function in the event of a secondary fault the circuit is designed with redundancies, in order to maintain function in the event of combined faults relays certified by UL or VDE are not required to have redundancies as the switching elements; if non-certified relays, electronic switches/switch units, or semiconductor relays are used, they should be redundant in order to maintain the redundancy for the entire protection circuit software controlling the control voltages WD1 and WD2 should represent software certified by VDE for functional safety The fuse resistor must be sized such that at maximum winding resistance the load in question is high enough that the fuse resistor is reliably triggered.

If a PTC is used as the safety element, it must be sized such that the resulting current flux at maximum winding resistance causes no impermissible heating.

Figure 2:
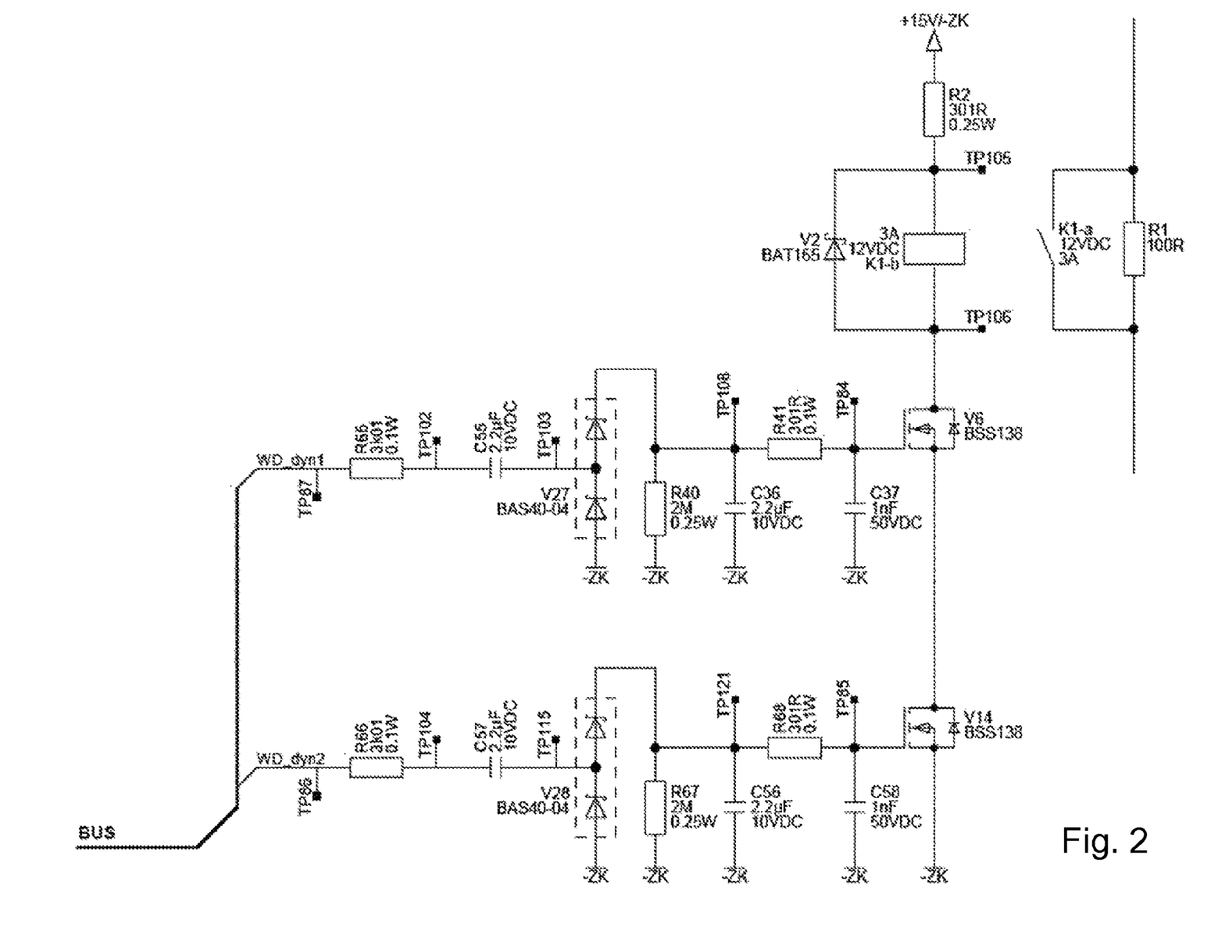
FIG. 2 is a schematic diagram of a concrete implementation of a protection circuit according to the invention.

FIG. 2 shows a concrete embodiment of an inventive protection circuit, with the protection circuit shown being largely equivalent to the exemplary embodiment according to FIG. 1. It should be pointed out that the reference numerals and characters in FIG. 2 are not identical to the ones in FIG. 1.

Further advantageous embodiments of the inventive protection circuit and/or the inverter system will now be described, although some passages herein may contain duplication from portions of the "Brief Summary" above. It is noted, in this regard, that the described inventive combination of control pulses and control circuit makes it possible to achieve that when the control pulses are received periodically, there is a constant output of a switching signal to the switching arrangement, causing the switching arrangement to remain in a conducting state. When the control pulse is absent, there is the option of "refreshing" the generation of the switching signal, until the expiration of the predetermined period, by outputting a new control pulse at the control circuit. If the predetermined period expires without the receipt of another control pulse, a switching signal is no longer generated and the switching arrangement is opened; i.e., the conducting state is left and, thus, a high-impedance condition is assumed between the two terminals of the switching arrangement. In this way the current no longer flows in the feed line to the power component via the switching arrangement, but rather via the safety element. Thus, the safety element can be triggered. In this case it would be conceivable, for example, to limit the flowing current to a predetermined value or to generate a high-impedance separation of the feed line from the power component. In this way it is possible to achieve a safe operation of the protection circuit in a normal state and simultaneously protect the inverter and/or the connected load against the absence of the control pulse. In this way it is possible to provide, without any excessive additional circuitry, a protection circuit, with which a power component can be set into a secure operating state, even if a PTOM or a loss-of-gate occurs at the power component. In this way the inverter and the load, connected to the inverter, are protected from further damage.

The term "feed line," in which the safety element is arranged, may relate to various areas between the power supply and the power component. When the inverter has, for example, a direct current voltage link, the safety element could be disposed in the line for the positive intermediate circuit direct current voltage. It would also be conceivable to arrange the safety element, if the inverter were connected to the power supply system, in the alternating voltage area. In a one-phase coupling, the safety element could be disposed in a connecting conductor to the phase used. In a three-phase coupling, an appropriate safety element could be provided for each of the phases. Then several switching arrangements or at least several independent poles of the switching arrangement should be provided.

In this context the term "conducting state" is understood to mean that the impedance between the two terminals of a switching contact of the switching arrangement has a low impedance value, preferably below $1\Omega$, in particular, preferably below $0.1\Omega$.

The "predetermined period", after which the output of the switching signals is terminated, is in certain embodiments defined by the design of the control circuit. In this case the period is selected in relation to a control pulse such that the predetermined period is greater than the period length between two successive control pulses. In certain embodiments the predetermined period is five times longer, in particular, preferably ten times longer than the period length between two successive control pulses.

The safety element may be formed in various ways. In this case the term "safety element" relates in general to a component or an assembly that is capable of limiting a potential current flux in the feed line to a maximum value. This may occur by interrupting the circuit upon a maximum current load being exceeded (such as a fuse, for example) or by a current-limiting effect (such as a resistance, for example). A person skilled in the art is aware of the different components that meet these requirements, with some exemplary embodiments being referenced in the following. For the sizing of the safety element it is essential that the safety element reliably trigger upon reaching the critical stage. This will normally depend on the standard operating conditions of the inverter and the load connected thereto. For example, when the load, operated by the inverter, comprises an electric motor, the inverter is usually specifically adjusted to the driven electric motor and in many cases even integrated in the housing of said electric motor. Thus, it is easy to provide a safety element that meets the requested boundary conditions. The boundary conditions for the operation are also sufficiently known in other applications, in order to define the conditions for a critical stage.

The control system is usually supplied with energy from the same source as the power component and the protection circuit. Thus, in an exemplary arrangement of the safety element, the control system is first supplied with energy via the safety element. When connecting the inverter system to the power supply, the control system is started. This includes in most cases the loading of the control program in a microcomputer, for example a microcontroller. In this phase of the startup, the current in the feed line to the power component is still relatively low, because the control system does not yet actuate the semiconductor switch of the inverter bridge; and, thus, no current has been applied yet to the load. Therefore, in this embodiment the safety element itself should be capable of transferring the power for the control system and the protection circuit. Due to the fact that furthermore, after switching on the inverter system, the internal capacitances (for example, a d.c. link capacitor) or inductances (for example, a filter throttle) are charged, the safety element should additionally be able to accept these currents.

A potential embodiment of the safety element could be given in a PTC (positive temperature coefficient) resistance. The use of PTCs in feed lines of devices is particularly known for limiting the switch-on current. This feature exploits the fact that a PTC heats up due to the current flux and shows increasingly higher impedance. As a result, the current flux can be limited. The use of a PTC as a safety element in a protection circuit according to the invention makes it possible to provide an additional benefit that goes beyond providing protection when switching on a device. When the PTC is used as a safety element for the protection circuit according to the invention, said PTC should be sized such that it can conduct the switch-on currents without problems. In order to act as a safety element, it should also be sized such that, for example, in the event of a PTOM, a critical current can no longer flow into the load so that thermal damage or any other damage to the load, resulting therefrom, is prevented.

According to another embodiment, the safety element could be formed by a fuse. That is, in this embodiment the safety element interrupts the feed line to the power component and, thus, the circuit when a predetermined maximum current flux is exceeded. Here, too, the statements made above regarding sizing are applicable accordingly. In order to avoid tripping the fuse during the switch-on process, additionally a switch-on current limiter may be provided, for example, in the form of an NTC.

In another embodiment the safety element is formed by a resistor. In this case the resistor may be sized as high impedance and with sufficient abilities for power consumption so that when opening the switching arrangement the resistor can limit the current flowing in the feed line. This embodiment has the advantage that the input voltage in the protection circuit is commonly known and/or assumes a defined maximum value. As a result, this embodiment of the safety element is comparatively independent of the load, operated by the inverter. For inverters sized for relatively small loads, this feature makes it very easy to realize a safety element.

In one exemplary embodiment the safety element is, however, formed by a safety resistor. A safety resistor—also known as a "fuse resistor"—is a resistor that has a first resistance value in an initial state. Here, resistance values of a few ohms up to triple digit values are common. Depending on the embodiment of the fuse resistor, resistances in the double-digit kΩ range can also be achieved. At the same time every fuse resistor has a maximum permissible load limit, up to which this first resistance value is maintained. When this limit load is exceeded, the fuse resistor assumes a second resistance value, which is considerably greater than the first resistance value. In this case resistance values in the MΩ range are common. This process is not reversible in most fuse resistors. Therefore, once the limit load has been exceeded, the fuse resistor must be exchanged. Due to the fact that the fault situation to be treated here requires in most cases an extensive repair of the inverter system, this circumstance is rather marginal compared to the benefit achieved thereby. Fuse resistors show the particular advantage that they trigger quickly and, after triggering, form a very high-impedance transition.

In one potential embodiment of a fuse resistor, the resistor is provided with a spring that is held in a tensioned state with a small amount of tin. This embodiment is common in wire wound wire resistors. A high load on the fuse resistor with a high current causes the fuse resistor to heat up, as a result of which the tin also heats up. When a temperature threshold is exceeded, the tin becomes so soft that it can no longer hold back the spring; and, therefore, said spring jumps into the relaxed state. At the same time the previously conducting contact is interrupted, and a high-impedance is assumed between the two terminals of the fuse resistor. It is also conceivable that there is an area in the resistor that melts at a high current load—similar to a common fuse. Appropriate embodiments are well known from the field.

In principle, a control pulse may assume various embodiments, as long as it is periodically outputted by the control system and can be suitably evaluated by a control circuit. For example, a sinusoidal half-wave, a triangle, or a ramp would be conceivable. However, in an exemplary embodiment the control pulse has a square shape. That is, the control pulse assumes a high level for a certain period of time and then drops back to the low level. In this case the transitions between low and high levels and/or high and low levels are very steep, ideally approximately vertical. This leads to the formation of a periodic output of the control pulses as square waves. This embodiment is particularly advantageous in that the microcontrollers that are used most frequently in control systems can generate square-wave signals in a particularly easy fashion. In certain embodiments the square-wave signal is unipolar; i.e., it alternates from a voltage of 0 V (low level) to a maximum voltage (high level), for example 3.3 V or 5 V.

In certain embodiments the sequence of control pulses is fed via a high-pass filter into the control circuit. In this way any component of the direct voltage that may be found in the control circuit is kept away from the control system. In addition, it is possible to provide a current limiter, with which the current from the control system into the control circuit is limited. In the simplest case this current limiter can be formed by a resistor.

In another embodiment the evaluation circuit comprises a charge pump. Charge pumps generate, from alternating signals at their input, a voltage, which is greater than the input voltage. Depending on the embodiment of the charge pump, different voltage increases can be realized. Simply designed charge pumps achieve double the voltage. For the use of a charge pump in the evaluation circuit it is essential that the sequence of control pulses forms an alternating signal. However, this is easily fulfilled by the demand for a periodic control pulse. Here, too, the use of a square-wave signal is particularly advantageous, because almost constant output voltages from the charge pump can be achieved in a relatively simple fashion.

In certain embodiments the charge pump is designed like a Greinacher circuit. For this purpose the charge pump has two diodes and one storage capacitor. The two diodes are connected in series, and each points away with its conducting direction from the ground. At the point of connection between the two diodes, the control pulses are inputted such that the point of connection forms the input to the charge pump. One of the two diodes is connected with its anode to ground. The cathode of the other diode is connected to a terminal of the storage capacitor, while the second terminal is connected to ground. Thus, the storage capacitor is connected parallel to the two diodes. Thus, at a high-level of a control pulse, current can flow via the diode, facing away from the ground, into the storage capacitor. As a result, the storage capacitor is charged successively.

In a further development a discharge resistor is connected parallel to the storage capacitor, by which the storage capacitor is discharged in a defined fashion. Thus, by suitably sizing the discharge resistor, the time elapsed since the most recently received control pulse up to the deactivation of the circuit signal can be defined. In certain embodiments the discharge resistor is designed as high-impedance; i.e., the resistance is at least 100 kΩ, in particular, preferably at least 1 MΩ.

In another exemplary embodiment the diodes of the charge pump are formed by Schottky diodes. Due to the fact that it has a lower forward threshold voltage than conventional diodes, the sequence of control pulses can be used more effectively.

The voltage at the storage capacitor can be used as a control signal. In this case a filter circuit, for example, in the form of a low pass circuit, may be provided in order to filter out any alternating components that may still be present. Additionally, the filter circuit may assume a protective function, for example by limiting the flowing current.

In another exemplary embodiment of the switching arrangement it is formed by a transistor, with the switching signal being applied to its control input. In the case of a bipolar transistor, this control input is formed by the base, for example. In a further development this transistor is formed by a MOSFET (metal oxide semiconductor field effect transistor) so that the control input is formed by the gate of the transistor. Preferably, in this case an enhancement type MOSFET is used, in particular, preferably an n-channel MOSFET. The transistor could be arranged parallel to the safety element and could switch through when a switching signal is applied and, thus, could conduct the current in the feed line to the power component.

In another exemplary embodiment of the switching arrangement it is formed by a relay, which has at least one switching contact and one exciter coil. At least one of the switching contacts is connected parallel to the safety element. A relay with several contacts, for example, three contacts, may be used to protect all three phases of a three phase power supply. A transistor may be provided to drive the current for the exciter coil; and this transistor in turn is designed as a MOSFET. Here, again an n-channel MOSFET, which is configured as an enhancement type, is used in a particularly preferred way.

For protection from multiple faults, the control circuit and/or the switching arrangement may be designed with redundancy. In this case two essentially identical control circuits may be provided, each generating one switching signal. When using transistors as the switching arrangements or as driver stages for the actual switching arrangement, they could be provided for every redundant leg of the control circuit, and, in so doing, be connected in series to each other. In this way, for example, a fault can be detected that one of the transistors for one of the redundant paths is defective and, thus, is permanently in a conducting state. When the control pulse is no longer applied to another leg of the redundant control circuit, the protection circuit can still be triggered.

Depending on the embodiment of the switching arrangement, individual parts may also be designed with redundancy, while other parts are present as one unit only. When the switching arrangement is formed by a relay, for example, it may be present only in one unit—when said relay is UL (Underwriters Laboratories) or VDE certified, for example. In the case of a dually designed control circuit, which respectively controls one transistor, the two transistors would be connected in series and would, for example, be connected on one side to ground, while the other side is connected to the exciter coil, with the second terminal of the exciter coil in turn being connected to a supply voltage.

In the inverter system according to the invention, in addition to the failure of the control system resulting in the absence of the control pulses, a malfunction inside the power component may also occur. Many inverter systems have a feedback from the load circuit, by means of which it is possible to draw conclusions about the operating state of the load and/or the power component. For example, an inverter for controlling an EC (electronically commutated) motor requires information about the position of the rotor in order to be able to output the correct voltages for the stator. This information can be obtained by a dedicated sensor or by way of estimation. In the event of a malfunction in the power component, the rotary motion of the motor will be clearly less homogeneous so that it is possible to draw conclusions about the operating state of the motor from the position signal. Other methods are also possible, for example, measuring the aggregate current. A person skilled in the art is aware of suitable methods that allow the user to draw conclusions about the operating state of the load and/or the power component. From the determined or estimated operating state, it can then be decided if a critical operating state exists, which requires triggering the protection circuit according to the invention.

In order to evaluate information regarding the operating state, a further development of the inverter system according to the invention provides means for detecting said operating state. These means may deactivate the generation of a control pulse upon detection of a critical operating state. In this way even in the event of a PTOM, the microcontroller can initiate a switching of the load into a safe operating state. When using a fuse resistor, this would mean that the electric motor is separated from the power supply system and perhaps specifically braked via a brake chopper.

It will be appreciated that many variations of the above described protection circuit are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE NUMERALS AND CHARACTERS

1 Protection circuit
2 Control circuit
3 Safety element
4 Switching arrangement
5 Charge pump
6 Exciter coil
7 Switching contact
8 Control input
K1 Relay
WD1 Control pulse 1
WD2 Control pulse 2
C1 Capacitor (high pass)
C2 Storage capacitor
C3 Capacitor (low pass)
C4 Capacitor (high pass)
C5 Storage capacitor
C6 Capacitor (low pass)
R1 Resistor
R2 Resistor (current limiter)

R3 Discharge resistor
R4 Fuse resistor
R5 Resistor
R6 Resistor (current limiter)
R7 Discharge resistor
V1 MOSFET (n-channel, enhancement type)
V2 Diodes $V2_o$ and $V2_u$
V3 MOSFET (n-channel, enhancement type)
V4 Diodes $V4_o$ and $V4_u$
AS1 Connecting terminal 1
AS2 Connecting terminal 2
SK1 Switching contact terminal 1
SK2 Switching contact terminal 2
LK1 Load circuit terminal 1
LK2 Load circuit terminal 2

The invention claimed is:

1. A protection circuit for an inverter, particularly for an inverter for an electric motor, with the inverter comprising a control system and a power component controlled by the control system, and with the control system being configured for the periodic output of a control pulse (WD1, WD2), the protective circuit comprising:
   a safety element (3),
   a switching arrangement (4), and
   a control circuit (2),
   wherein:
      the safety element (3) is arranged in a feed line to the power component,
      the switching arrangement (4) is connected to the safety element (3) such that the switching arrangement (4) bridges the safety element (3) into a switched-through state when the switching arrangement (4) is in a conducting state,
      the control circuit (2) comprises a control input (8, 8'), at which the control pulse (WD1, WD2) is applied, and
      the control circuit (2) is configured such that the control circuit (2), upon receipt of a control pulse (WD1, WD2) or several successive control pulses (WD1, WD2) outputs for a predetermined period of time a switching signal to the switching arrangement (4), causing the switching arrangement (4) to: switch through when periodically receiving the control pulse (WD1, WD2), and to, in the absence of the control pulse (WD1, WD2), open after a predetermined period and trigger a protection of the inverter by the safety element (3).

2. A protection circuit according to claim 1, wherein the safety element (3) is formed by a resistor having a defined resistance.

3. A protection circuit according to claim 2, wherein the resistance is embodied as a PTC (positive temperature coefficient), with the PTC with increasing temperature assuming greater impedance levels.

4. A protection circuit according to claim 2, wherein the resistance is provided via a safety resistor (fuse resistor) (R4), wherein the safety resistor (R4) comprises in an initial state a first resistance value, and the safety resistor (R4), upon a limit load being exceeded, assumes a second resistance value greater than the first resistance value.

5. A protection circuit according to claim 1, wherein a sequence of periodically emitted control pulses (WD1, WD2) forms a square-wave signal.

6. A protection circuit according to claim 1, wherein a sequence of periodically emitted control pulses (WD1, WD2) forms a unipolar square-wave signal.

7. A protection circuit according to claim 1, wherein the control circuit (2) comprises a charge pump (5, 5'), and the control pulse (WD1, WD2) is applied at an input of the charge pump (5, 5').

8. A protection circuit according to claim 7, wherein the charge pump (5, 5') comprises two diodes ($V2_u$, $V2_o$, $V4_u$, $V4_o$) and a storage capacitor (C2, C5), with the two diodes ($V2_u$, $V2_o$, $V4_u$, $V4_o$) being connected serially and the conducting directions of both diodes ($V2_o$, $V2_o$, $V4_o$, $V4_o$) pointing away from a ground, with the input of the charge pump being formed by the point of connection between the two diodes ($V2_u$, $V2_o$, $V4_u$, $V4_o$), and with the storage capacitor (C2, C5) being connected in parallel with both diodes ($V2_u$, $V2_o$, $V4_u$, $V4_o$).

9. A protection circuit according to claim 1, wherein the control pulse (WD1, WD2) is applied via a high-pass filter.

10. A protection circuit according to claim 9, wherein a discharge resistor (R3, R7) is connected in parallel to the storage capacitor (C2, C5) such that the storage capacitor (C2, C5) is discharged in a defined fashion via the discharge resistor (R3, R7).

11. A protection circuit according to claim 9, wherein the voltage at the storage capacitor (C2, C5) forms the switching signal after filtering via a filter circuit.

12. A protection circuit according to claim 1, wherein the switching arrangement (4) is formed by a transistor, with the switching signal being input to a control input of the transistor.

13. A protection circuit according to claim 12, wherein the transistor is a MOSFET (metal oxide semiconductor field effect transistor).

14. A protection circuit according to claim 1, wherein the switching arrangement is formed by a relay (K1) with at least one switching contact (7) and an exciter coil (6), with one of the at least one switching contact (7) being arranged parallel to the safety element (3).

15. A protection circuit according to claim 14, wherein the switching signal is input to a control input of a transistor, and the transistor controls the current for the exciter coil (6).

16. A protection circuit according to claim 15, wherein the control input of the transistor is a MOSFET (V1, V3).

17. A protection circuit according to claim 1, wherein at least one of the control circuit (2) or the switching arrangement (4) are embodied in a redundant manner, with the control circuit (2) comprising at least two paths or legs.

18. A protection circuit according to claim 17, wherein the at least two paths or legs are two identically embodied paths or legs.

19. A protection circuit according to claim 17, wherein a transistor is provided for each of the redundant paths or legs of the control circuit (2), with the transistors being connected serially.

20. An inverter system with a control system, a power component, and a protection circuit (1) according to claim 1, with the control system being configured for outputting control signals to the power component in order to generate and issue an alternating voltage, with the control system additionally being configured for a periodic output of a control pulse (WD1, WD2) input to the protection circuit (1).

21. An inverter system according to claim 20, further comprising means for detecting an operating state of the inverter system and/or a load connected to the inverter system, with the means for detecting the operating state being configured to deactivate the generation of a control pulse (WD1, WD2) in the event of a critical operating state.

* * * * *